(12) United States Patent
Kowalski et al.

(10) Patent No.: US 11,606,946 B1
(45) Date of Patent: Mar. 21, 2023

(54) FISHING ROD STAND ASSEMBLY

(71) Applicant: ACTIVE OUTDOORS LLC, Glen Lyon, PA (US)

(72) Inventors: James M. Kowalski, Nanticoke, PA (US); David D. McClanahan, Harleysville, PA (US)

(73) Assignee: ACTIVE OUTDOORS LLC, Glen Lyon, PA (US)

( * ) Notice: Subject to any disclaimer, the term of this patent is extended or adjusted under 35 U.S.C. 154(b) by 26 days.

(21) Appl. No.: 17/714,057

(22) Filed: Apr. 5, 2022

(51) Int. Cl.
| | | |
|---|---|---|
| *A01K 97/10* | (2006.01) | |
| *F16M 11/24* | (2006.01) | |
| *F16M 11/32* | (2006.01) | |

(52) U.S. Cl.
CPC ............ *A01K 97/10* (2013.01); *F16M 11/245* (2013.01); *F16M 11/32* (2013.01)

(58) Field of Classification Search
CPC ...... A01K 97/10; F16M 11/245; F16M 11/34; F16M 11/32; F16M 11/242; F16M 11/28; F16M 11/30; F16M 11/16; F41A 23/12; F41A 23/14
USPC ......... 248/520, 170, 440, 440.1, 163.1, 166, 248/434
See application file for complete search history.

(56) References Cited

U.S. PATENT DOCUMENTS

| | | |
|---|---|---|
| 1,849,898 A | 3/1932 | Wright |
| 1,894,695 A * | 1/1933 | Ley ........................ F16M 11/10 248/185.1 |
| 2,031,097 A | 2/1936 | Bucky |
| 2,646,956 A | 7/1953 | Cadwell et al. |
| 2,763,453 A * | 9/1956 | Palino ................ F16M 11/2014 403/104 |
| 2,832,555 A | 4/1958 | Terhune |
| 2,849,202 A | 4/1958 | McCombs |
| 4,086,716 A | 5/1978 | Donahue |
| 4,215,839 A | 8/1980 | Gibran |
| 4,236,339 A * | 12/1980 | White ..................... A01K 97/10 43/17 |
| 4,366,940 A | 1/1983 | Vargas |
| 5,072,910 A | 12/1991 | May |
| 5,308,029 A | 5/1994 | Bingham |
| 5,400,996 A | 3/1995 | Drish |
| 6,450,464 B1 * | 9/2002 | Thomas ............... F16M 11/046 248/431 |
| 7,631,842 B2 * | 12/2009 | Crain ..................... F16M 11/10 248/176.1 |

(Continued)

*Primary Examiner* — Ingrid M Weinhold
(74) *Attorney, Agent, or Firm* — Invention To Patent Sendees; Alex Hobson

(57) ABSTRACT

A fishing rod stand assembly utilizes a fishing rod support configured to retained by a fishing rod support tripod. The fishing rod support comprises a shaft that extends from an insert end to a yolk end having a Y-shaped yoke to retain a fishing rod therein. The fishing rod support tripod has a leg hub and an arm hub configured to receive the fishing rod support shaft. The leg hub and/or the arm hub have flanges that are configured to flex radially outward to receive and retain the shaft which enables insertion of various diameter shafts. Three legs extend out from the leg hub and support arms extend from the arm hub to support arm couplings coupled with each of the legs. The tripod has a pair of fixed legs and an angle adjustable leg that can be pivoted about the leg hub and be retained in an offset angle for placement on uneven surfaces.

19 Claims, 10 Drawing Sheets

(56) References Cited

U.S. PATENT DOCUMENTS

| | | | |
|---|---|---|---|
| D647,995 S * | 11/2011 | Kowalski | D22/147 |
| 8,453,372 B1 | 6/2013 | Moe | |
| 8,505,867 B2 | 8/2013 | Conrad | |
| 10,798,931 B1 | 10/2020 | Canny | |
| 11,028,965 B2 * | 6/2021 | Christensen | F16M 11/04 |
| 2012/0204469 A1 * | 8/2012 | Kowalski | A01K 97/10 43/17.5 |
| 2019/0249821 A1 * | 8/2019 | Christensen | G03B 17/561 |
| 2020/0173603 A1 * | 6/2020 | Yeomans | E01F 9/688 |

\* cited by examiner

FISHING ROD STAND ASSEMBLY

BACKGROUND OF THE INVENTION

Field of the Invention

The invention relates to a fishing rod stand assembly that utilizes a fishing rod support configured to be retained by a fishing rod support tripod.

Background

People often use sand pole holders when fishing on the beach, wherein the sand pole holder is a cylindrical and has a tapered end for insertion into the sand. A handle end of a fishing rod can then be inserted into the cylinder and retained during fishing or rigging the line. There are many other locations however when a sand pole holder can not be used, such as when ice fishing or when fishing on the banks of a lake, pond, river or stream, for example.

SUMMARY OF THE INVENTION

The invention is directed to a fishing rod stand assembly that utilizes a fishing rod support configured to retained by a fishing rod support tripod. The fishing rod support comprises a shaft that extends from an insert end, which may be a tapered and pointed, to a yolk end, comprising the rod yoke. A rod yoke is a Y-shaped rod holder formed by a first yoke extension and a second yoke extension that extend to form a Y-shape. The fishing rod support tripod has a leg hub and an arm hub configured to receive the fishing rod support shaft. The leg hub and/or the arm hub have flanges that are configured to flex radially outward to receive and retain the shaft. The tripod has a pair of fixed legs and an angle adjustable leg that can be pivoted about the leg hub and retained in a offset angle for placement on uneven surfaces.

The fishing rod support shaft has a length from the insert end, to the yoke end that may be about 12 in or more, about 18 in or more, about 24 in of more, about 30 in or more and any length between and including the lengths provided. The fishing rod support shaft may be length adjustable, wherein it includes a plurality of shaft portions that are telescoping.

The fishing rod support tripod has three legs and three corresponding arms extending from the arm hub to one of the legs, such as to a support arm coupling. The tripod legs extend from a leg-hub end to a foot end, which may be configured with a foot thereon. The foot may be tapered to the foot end and may comprise a metal portion. In an exemplary embodiment, the foot is made of metal and is tapered down to the foot end to better enable insertion into the ground or ice and to prevent sliding of the tripod along a ground surface. The fixed legs and the angle adjustable leg may be fixed in length which may be about 10 in or more, about 12 in or more, about 16 in or more, about 20 in or more and any range between and including the length values provided.

The support arms extend from a leg end to an arm-hub end. The support arms pivot about an arm-hub pivot coupled to the arm hub and about an arm-coupling pivot on the leg end of the support arm. The support arms pivot as the legs pivot about the leg-hub pivot as the leg hub is pulled away and/or towards the arm hub. The arms pivot to lay along an inside of a portion of the leg. The tripod can be deployed in a stand configuration by pushing the leg hub down toward the arm hub, which causes the legs to pivot out and away from the arm hub. The leg hub may be pushed down until it hits the arm hub. The shaft of the fishing rod support can be inserted through the apertures in the leg hub and arm hub. The fishing rod support tripod can be collapse with the fishing rod support shaft configured through the leg hub aperture and arm hub aperture by separating the leg hub from the arm hub along the length of the shaft.

Each of the leg hub and arm hub may have flanges on one or both ends that are flexible and are configured to flex outward around the shaft of the fishing rod support to secure and retain the shaft. In an exemplary embodiment, both ends of both of the leg hub and the arm hub comprise flanges for retaining the shaft. These flanges may enable insertion of various sized or diameter fishing rod support shafts.

The angle adjustable leg has a slidable support-arm coupling that couples the arm to the angle adjustable leg and is configured to slide along the angle adjustable leg to cause the angle adjustable leg to pivot about the leg-hub pivot. A support-arm coupling lock is configured to retain the slidable support-arm coupling in a fixed position along the length of the angle adjustable leg. A support-arm coupling lock may comprises a knob and post assembly that can be turned to force the post onto the outer leg surface to prevent the slidable support-arm coupling from sliding along the leg. The support-arm coupling lock may employ a knob that is configured around the leg and configured to turn down over the slidable support-arm coupling to create a compression pressure around the leg to prevent the slidable support-arm coupling from sliding. The slidable support-arm coupling may comprise a threaded portion, such as female threads, configured to interface with a threaded portion of the support-arm coupling lock, such as female threads.

A leg stop may be configured on the angle adjustable leg that is adjustable in position along the length of the angle adjustable leg. The leg stop may be positioned for locating the slidable support-arm coupling in a position for collapsing the fishing rod support tripod. With the slidable support-arm coupling configured against the leg stop, the angle adjustable leg may then fold up with the same spacing as the other two fixed legs and their associated arms. The leg stop may be a rubber, elastomeric or plastic ring that can be slid along the angle adjustable leg with some force, for example.

The arms provide stability for the legs and prevent excessive flexing of the legs when a torque force is caused by the fishing rod support, such as when a fish takes the bait and pulls on the fishing rod.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
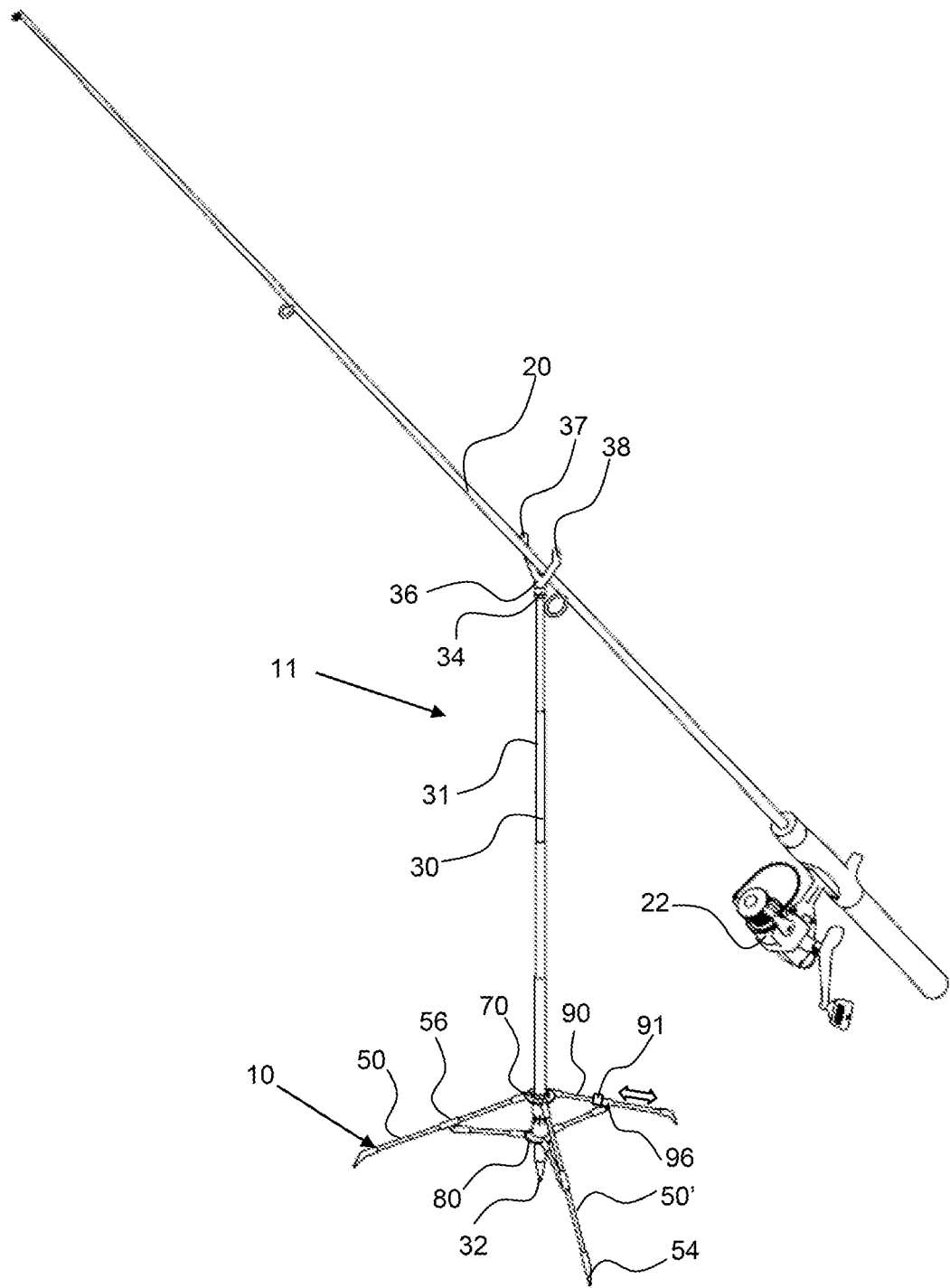
FIG. 1 shows a fishing stand assembly having a fishing rod tripod that is configured to secure a fishing rod support that is used to retain a fishing rod in the rod yoke of the fishing rod support.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Referring now to FIGS. 1 to 5, an exemplary fishing rod stand assembly 11 has a fishing rod support tripod 10 that is configured to secure a fishing rod support 30 that is used to retain a fishing rod 20 in the rod yoke 36 of the fishing rod support. The fishing rod with the reel 22 attached may be secured by the fishing rod support with the fishing line in the water. The fishing rod support 30 has a rod yoke 36 with a first yoke extension 37 and second yoke extension 38 forming a Y-shaped support for the fishing rod. The fishing rod support shaft 31 is configured to extend through apertures in the leg hub 70 and arm hub 80 of the fishing rod support tripod 10.

The fishing rod support tripod 10 has three legs and three corresponding arms extending from the arm hub 80 to one of the legs, such as to a support arm coupling. Two of the tripod legs are fixed legs 50, 50' and one is an angle adjustable leg 90.

The fixed tripod legs extend from a leg-hub end 52 to a foot end 54, which may be configured with a foot 58 thereon. The fixed tripod legs pivot about the leg-hub pivot 55 coupled to the leg hub 70. The angle adjustable tripod leg extends from a leg-hub end 92 to a foot end 94, which may be configured with a foot 98 thereon. The fixed legs and the angle adjustable leg may be fixed in length as described herein.

The support arms 60, 60' 60", extend from a leg end 64 to an arm-hub end 62. The support arms pivot about an arm-hub pivot 65 coupled to the arm hub 80 and about an arm-coupling pivot 66 on the leg end of the support arm which may be coupled to the support arm coupling 56 that couples the leg to the support arm. The support arms pivot as the legs pivot about the leg-hub pivot as the leg hub is pulled away from the arm hub. The arms pivot to lay along an inside of a portion of the leg.

Figure 2:
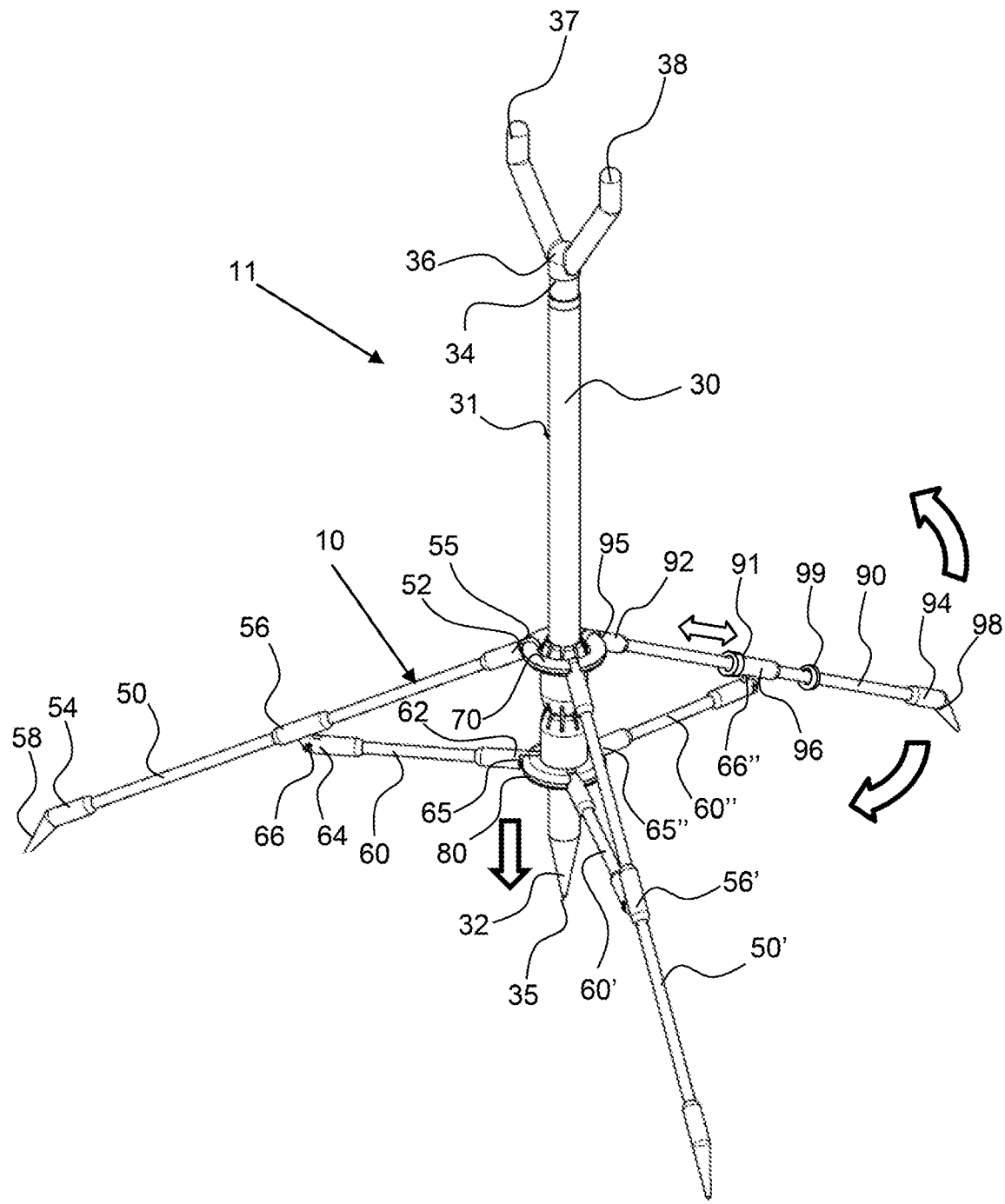
FIG. 2 shows a fishing rod tripod having an angle adjustable leg that has a slidable support-arm coupling configured to slide along a portion of the length of the angle adjustable leg.

The angle adjustable leg 90 is configured with a slidable support-arm coupling 96 to allow the angle adjustable leg to pivot in or away from the arm hub 80 about the leg-hub pivot 95; as indicated by the bold curved arrows in FIG. 2. The slidable support-arm coupling 96 has a support-arm coupling lock 91 that is configured to secure the slidable support-arm coupling 96 in a fixed position along the length of the adjustable leg 90. The arm 60" coupled to the slidable support-arm coupling 96 pivots about the arm-hub pivot 65" and arm-coupling pivot 66" to enable the slidable support-arm coupling 96 to slide along the angle adjustable leg 90 for adjustment of the angle of the angle adjustable leg. A leg stop 99 is configured on the angle adjustable leg 90 and is configured to provide a stop for the slidable support-arm coupling 96. A user may adjust the angle of the angle adjustable leg while in use and then release the support arm coupling lock 91 and slide the slidable support-arm coupling 96 up against the leg stop 99 before collapsing the tripod along the shaft 31 of the fishing rod support 30. The stop may be a ring and may be configured to slide with some force along the length of the angle adjustable leg 90. The two fixed legs, 50, 50' have a fixed support-arm coupling 56, 56' respectively, that does not slide along the length of the leg.

Figure 3:
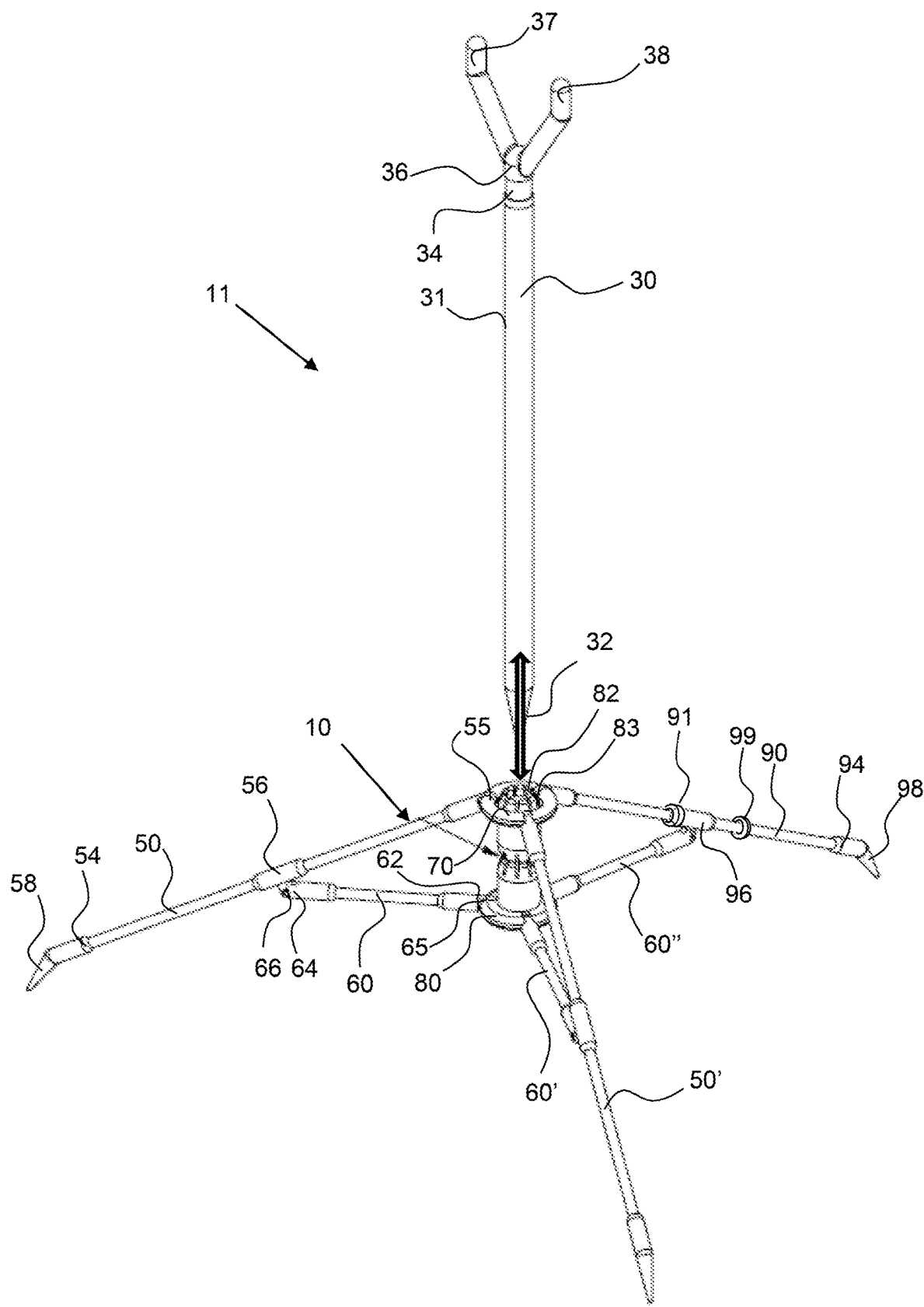
FIG. 3 shows a fishing rod tripod with the insert end of the fishing rod support shaft configured for insertion into the rod support aperture of the leg hub.
Figure 4:
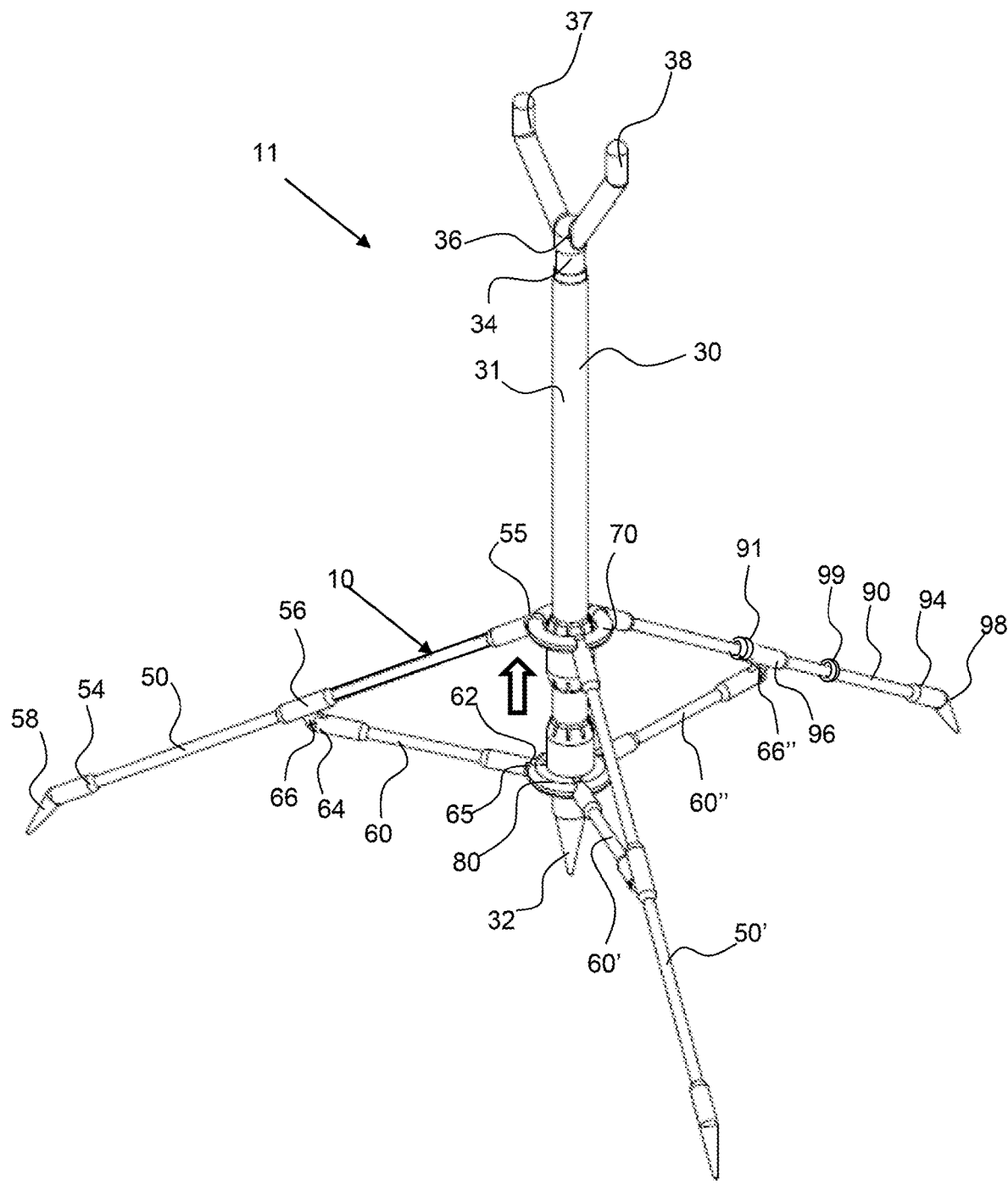
FIG. 4 shows the fishing rod tripod shown in FIG. 3, with the fishing rod support shaft inserted through the leg hub and arm hub and retained by the flanges on each of said hubs.

As shown in FIG. 3, the insert end 32 of the fishing rod support shaft 31 is configured for insertion into the rod support aperture 72 of the leg hub 70, and may have a tapered inert end 35 that tapers to a point for insertion into a ground surface for additional support. As shown in FIG. 4, the fishing rod support shaft 31 is inserted through the leg hub 70 and arm hub 80 and retained by the flanges on each of said hubs. The fishing rod support shaft 31 has a length from the insert end 32 to the rod end 34.

Figure 5:
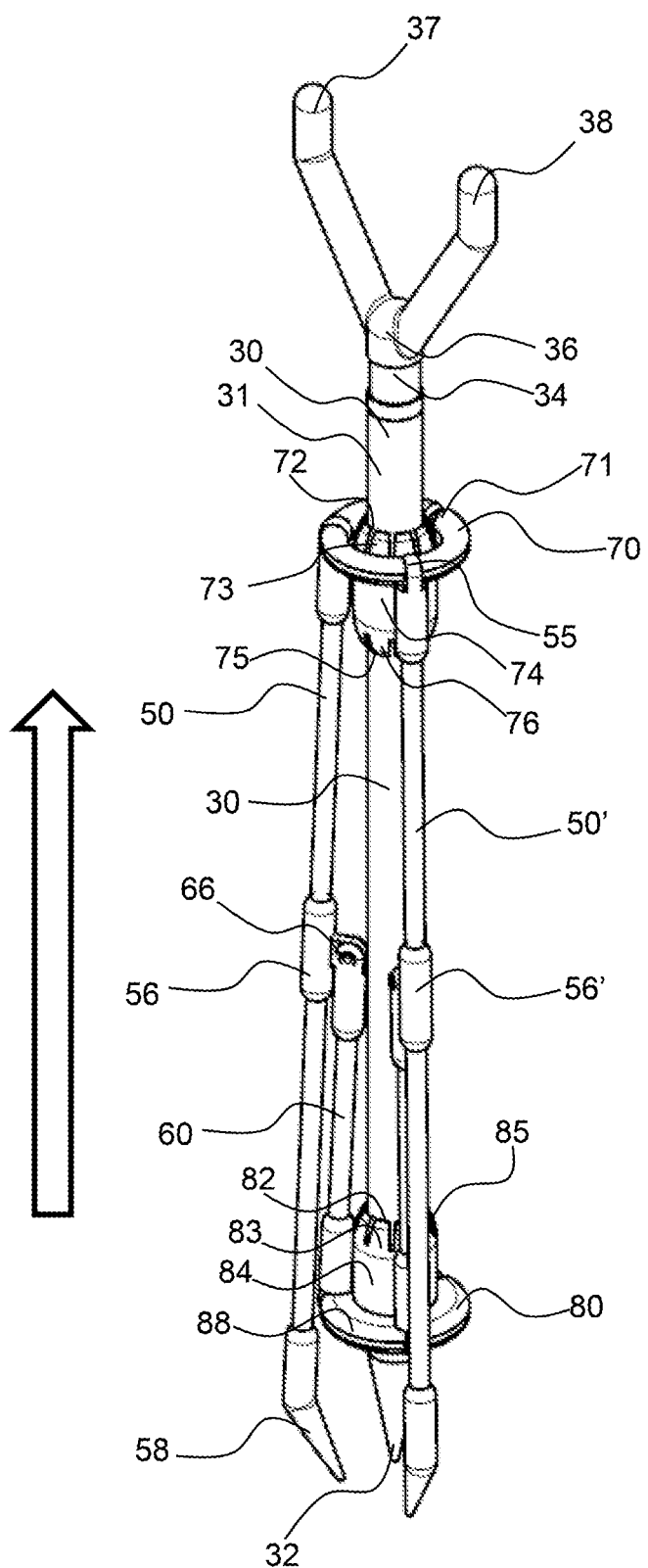
FIG. 5 shows the fishing rod tripod shown in FIG. 4, with the fishing rod support tripod in a collapsed configuration, with the leg hub pulled up along the fishing rod support shaft to pivot the legs and support arms along the fishing rod support shaft.

As shown in FIG. 5, the fishing rod tripod is configured in a collapsed configuration, with the leg hub 70 pulled up along the fishing rod support shaft 31 to pivot the legs and support arms along the fishing rod support shaft. This configuration may be used for transport and storage of the fishing rod stand assembly 11.

Figure 6:
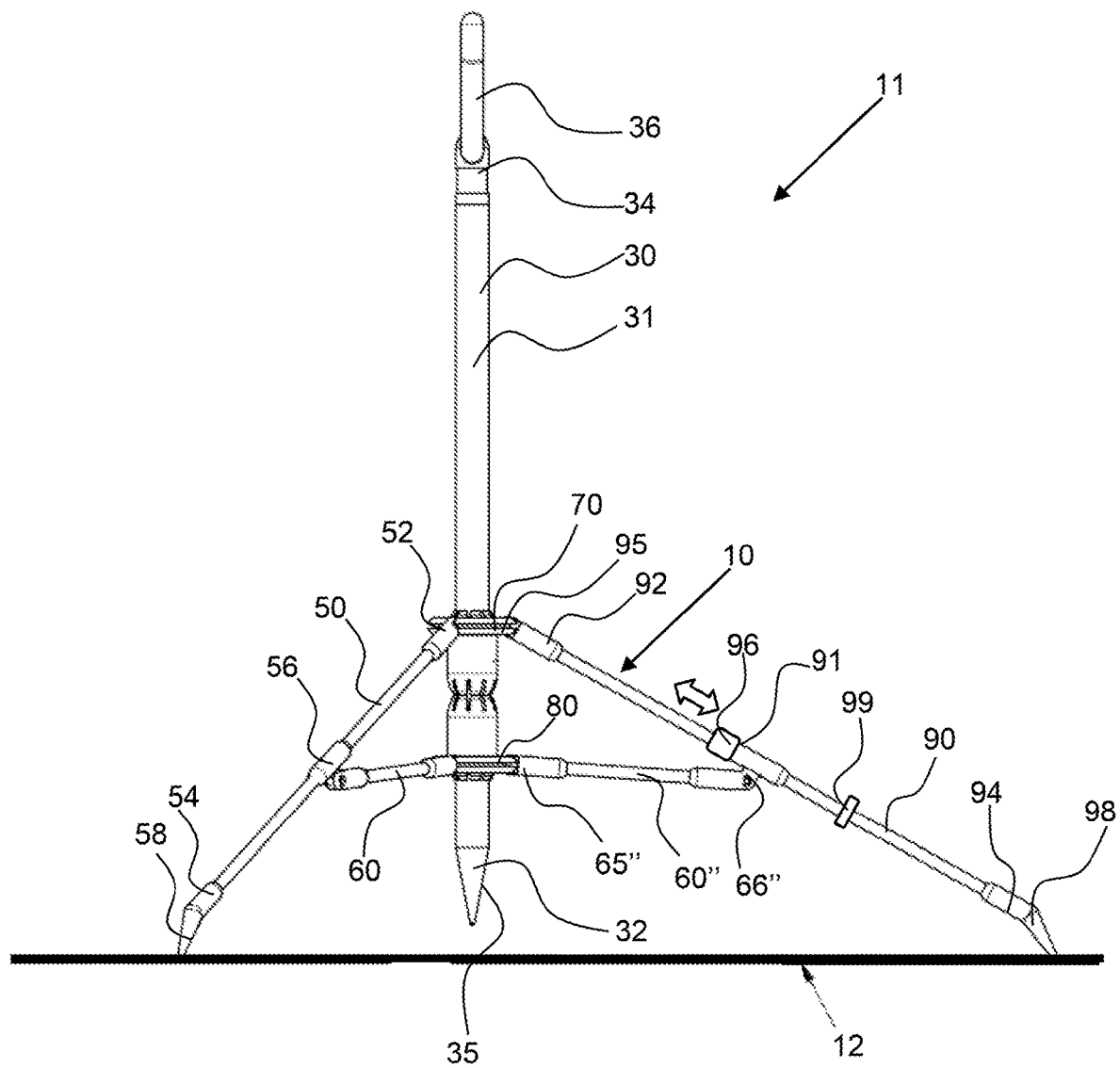
FIG. 6 shows a fishing rod tripod configured on a ground surface that is horizontal with the insert end of the fishing rod support shaft extending through the leg hub and arm hub.

As shown in FIG. 6, the fishing rod support tripod 10 is configured on a ground surface 12 that is horizontal with the insert end 32 of the fishing rod support shaft extending through the leg hub 70 and arm hub 80. The angle adjustable leg 90 has the foot 98 even with the other two feet 58 of the fixed legs.

Figure 7:
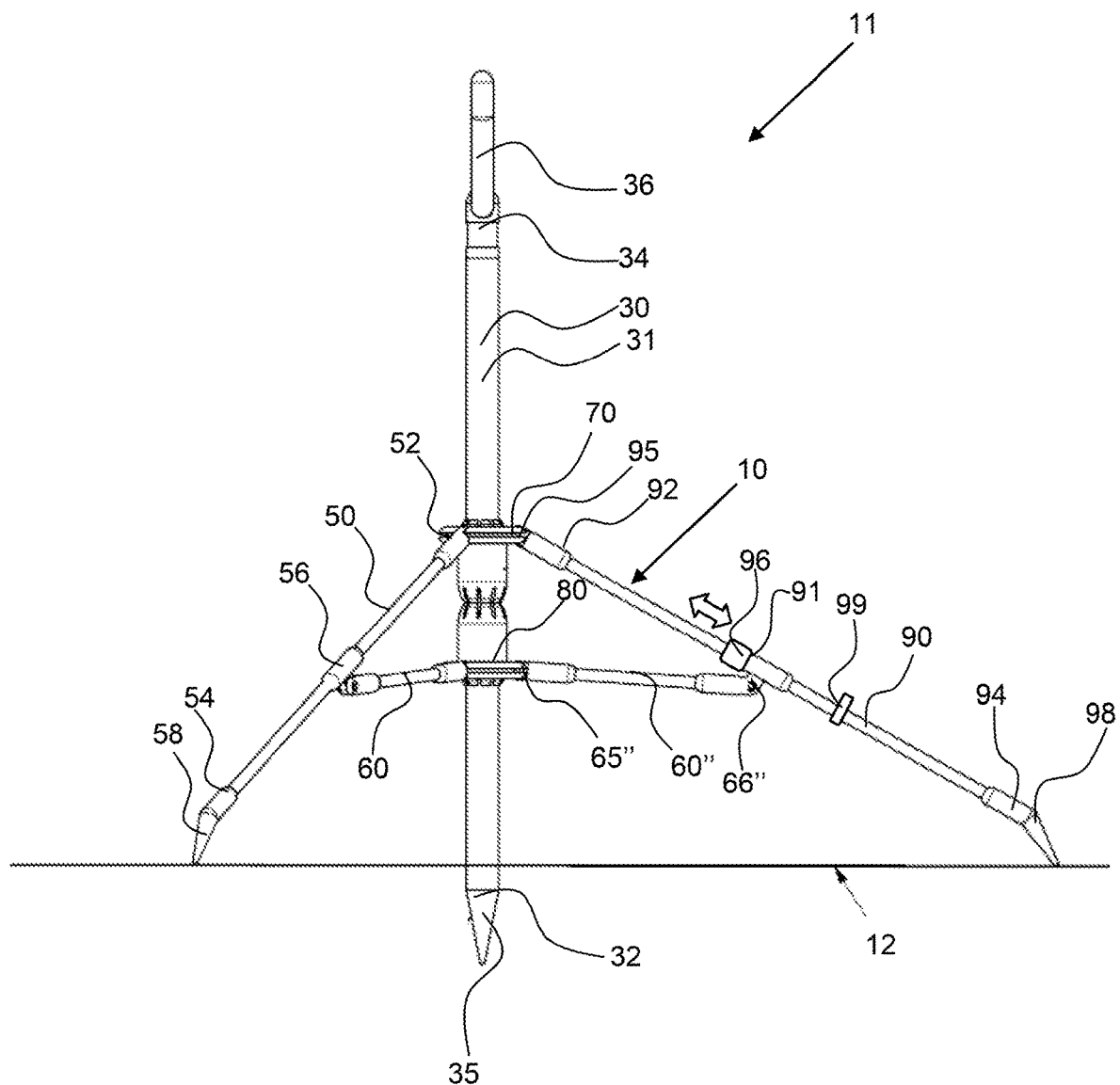
FIG. 7 shows the fishing rod tripod shown in FIG. 6, with the insert end of the fishing rod support shaft extending into the ground surface to provide additional stability and support.

As shown in FIG. 7, the fishing rod support tripod 10 shown in FIG. 6 is configured with the insert end 32 of the fishing rod support shaft 31 extending into the ground surface 12 to provide additional stability and support.

Figure 8:
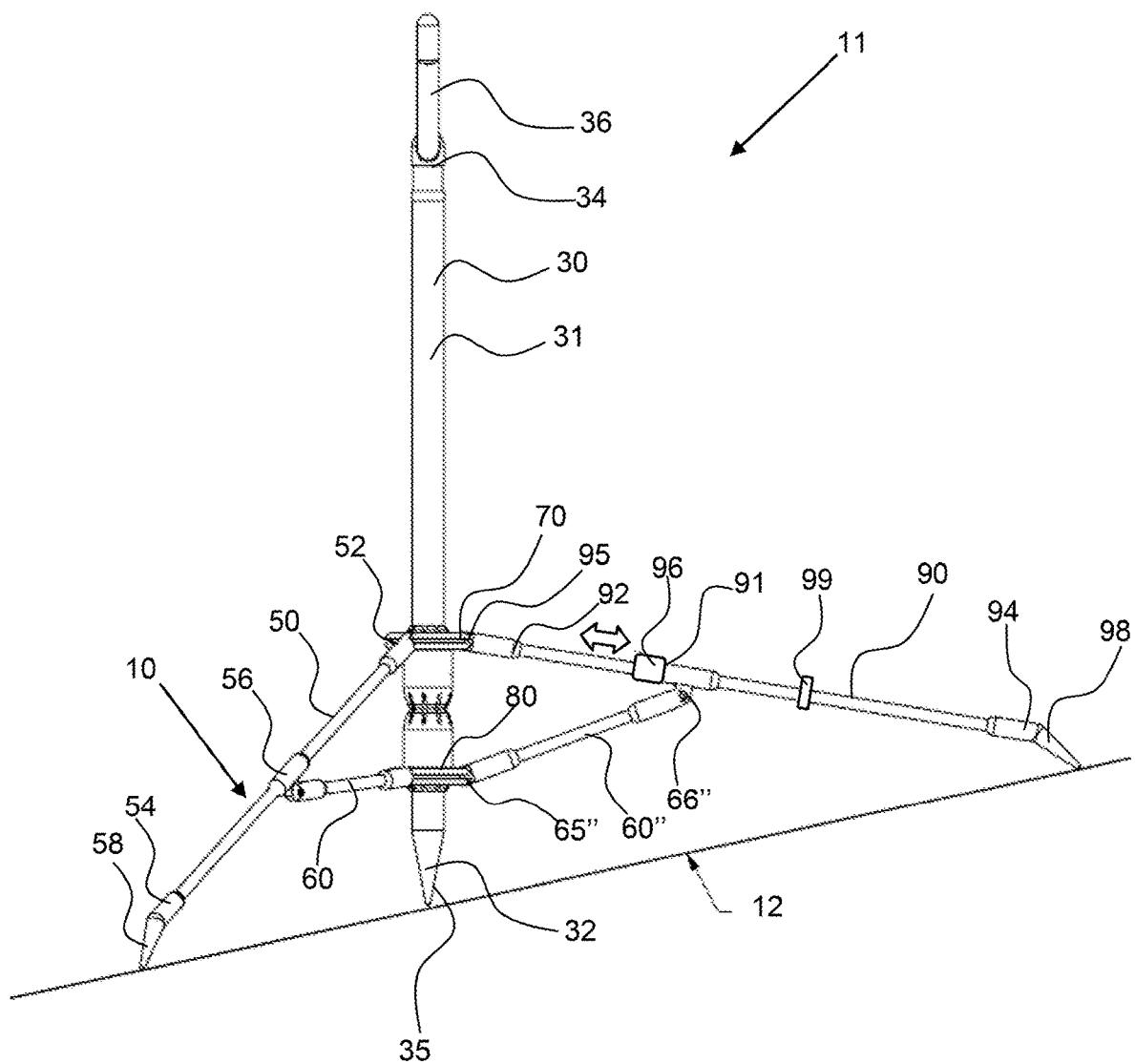
FIG. 8 shows a fishing rod tripod configured on a down sloping ground surface with the angle adjustable leg configured on an elevated side and angled up to provide a secure and stable support for the fishing rod support.

As shown in FIG. 8, a fishing rod support tripod 10 is configured on a down sloping ground surface 12 with the angle adjustable leg 90 configured on an elevated side and angled up to provide a secure and stable support for the fishing rod support. The slidable support-arm coupling 96 has be slid toward the leg hub 70 or up toward the hub end 92 of the adjustable leg to angle the adjustable leg upward.

Figure 9:
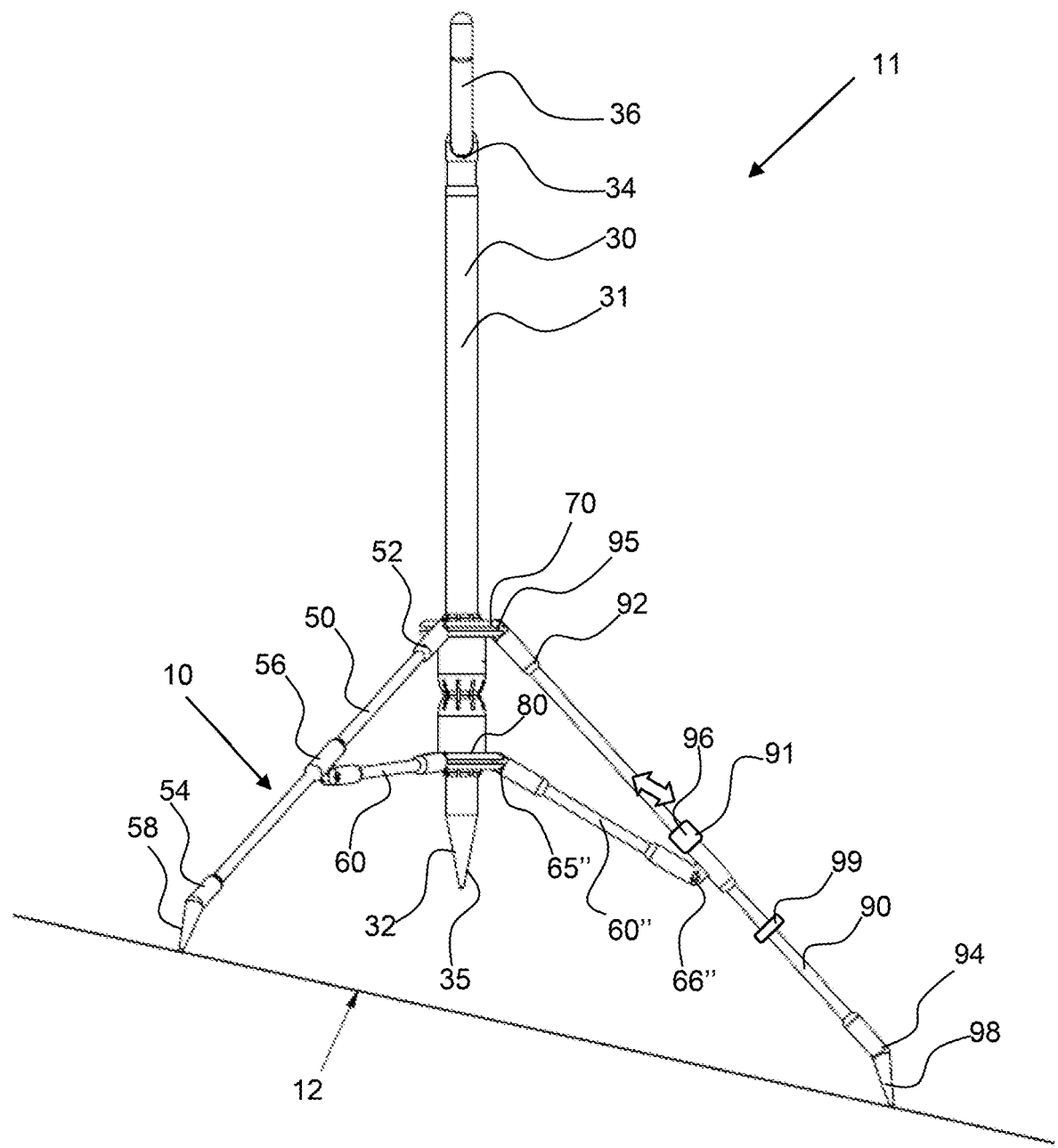
FIG. 9 shows a fishing rod tripod configured on a up sloping ground surface with the angle adjustable leg configured on a lower side and downward to provide a secure and stable support for the fishing rod support.

As shown in FIG. 9, the fishing rod support tripod 10 is configured on an upward sloping ground surface 12 with the angle adjustable leg 90 configured on the lower side and angled downward to provide a secure and stable support for the fishing rod support. The slidable support-arm coupling 96 has be slid toward the foot end 94 or away from the leg hub 70 to angle the angle adjustable leg downward.

Referring now to FIGS. 10-13, each of the leg hub 70 and arm hub 80 are configured with apertures and flanges for securing the fishing rod support shaft therein.

Figure 10:
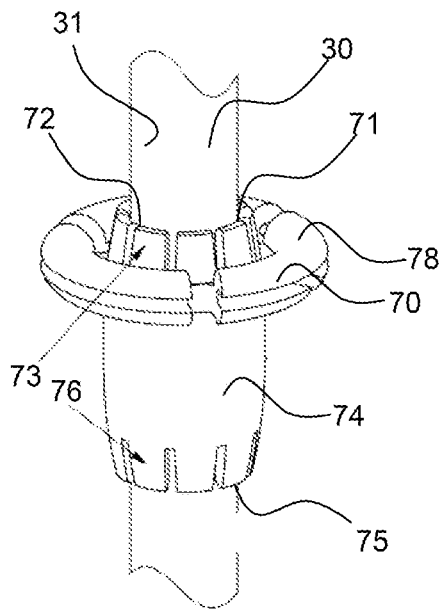
FIG. 10 shows a leg hub with the fishing rod support shaft extended through the hub and retained by the leg-hub flanges and leg-hub end flanges.

As shown in FIG. 10, the leg hub 70 extends from the leg-pivot end 71 to the arm-hub end 75. A leg hub pivot ring 78 is configured for securing the legs to the leg hub 70. Leg-hub flanges 73 are configured to flex radially outward around the fishing rod support shaft 31 to secure the fishing rod support shaft within the rod support aperture 72 of the hub. The leg-hub extension 74 extends down from the leg hub pivot ring and leg-hub end flanges 76 are configured on the arm-hub end 75.

Figure 11:
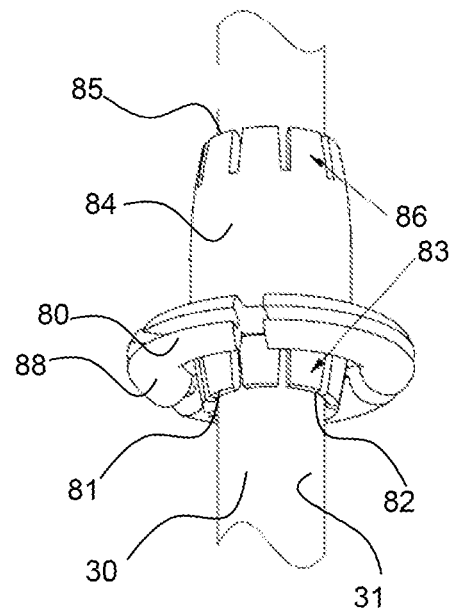
FIG. 11 shows an arm hub with the fishing rod support shaft extended through the hub and retained by the arm-hub flanges and the arm-hub end flanges.

As shown in FIG. 11, the arm hub 80 extends from the arm-pivot end 81 to the leg-hub end 85. An arm hub pivot ring 88 is configured for securing the arms to the arm hub 80. Arm-hub flanges 83 are configured to flex radially outward around the fishing rod support shaft 31 to secure the fishing rod support shaft within the rod support aperture 82 of the arm hub. The arm-hub extension 84 extends from the arm hub pivot ring and arm-hub end flanges 86 are configured on the leg-hub end 85.

Figure 12:
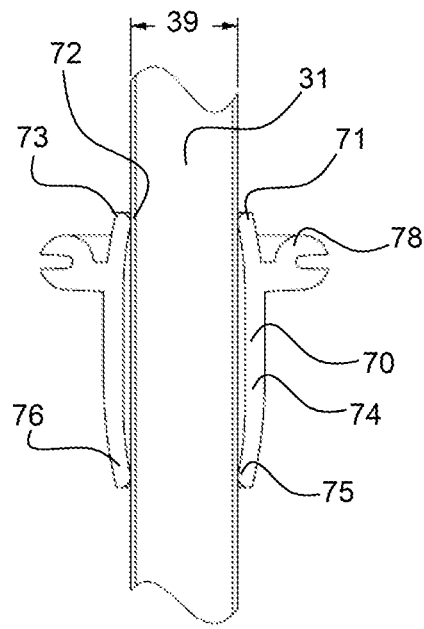
FIG. 12 shows a cross sectional view of a small diameter fishing rod support shaft extending through the leg hub.
Figure 13:
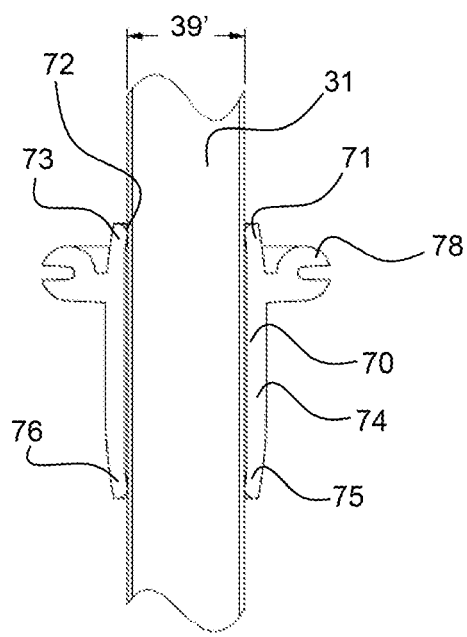
FIG. 13 shows a cross sectional view of a large diameter fishing rod support shaft extending through the leg hub.

As shown in FIGS. 12 and 13, the rod support aperture 72 of the leg hub is configured to receive a range of fishing rod support shafts 31 with different diameters 39, 39'. The leg-hub flanges 73 and the leg-hub end flanges 76 are configured to flex radially outward to both accommodate insertion and retention of various diameter shafts 31. The fishing rod support shaft 31 shown in FIG. 12 is smaller in diameter than the fishing rod support shaft shown in FIG. 13.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A fishing rod stand assembly comprising:
   a) a fishing rod support comprising:
      i) a shaft extending from an insert end to a rod end;
   b) a fishing rod support tripod comprising:
      i) a leg hub;
      ii) an arm hub;
      iii) a plurality of support arms;
      iv) a pair of legs each extending from a respective hub end to a respective foot end;
         wherein the hub end of each of the pair of legs is coupled to the leg hub by a respective leg-hub pivot; and
         wherein each of the pair of legs is coupled to the arm hub by a respective one of the plurality of support arms coupled to the respective leg by an arm-coupling pivot and to the arm hub by an arm-hub pivot;
      v) an angle adjustable leg extending from a hub end to a foot end;
         wherein the hub end of the angle adjustable leg is coupled to the leg hub by a leg-hub pivot; and
      wherein the angle adjustable leg is coupled to the arm hub by a respective one of the plurality of support arms that is coupled to the angle adjustable leg by an arm-coupling pivot and to the arm hub by an arm-hub pivot;
      wherein the arm-coupling pivot coupled to the angle adjustable leg is attached to a slidable support-arm coupling that is configured to slide along the angle adjustable leg to change an angle of the angle adjustable leg,
      wherein the leg hub is configured to slide along the shaft of the fishing rod support to pivot the pair of legs and the angle adjustable leg in towards the arm hub, and
      wherein the leg hub comprises hub flanges that are configured to flex radially outward to receive the fishing rod support shaft.

2. The fishing rod stand assembly of claim 1, wherein the leg hub extends from a leg-pivot end to an arm-hub end that is proximal to the arm hub and wherein the hub flanges are configured on the leg-pivot end.

3. The fishing rod stand assembly of claim 2, wherein the leg hub further comprises leg-hub end flanges configured on the arm-hub end of the leg hub.

4. The fishing rod stand assembly of claim 3, wherein the arm hub comprises hub flanges configured to flex radially outward to receive the fishing rod support shaft.

5. The fishing rod stand assembly of claim 4, wherein the arm hub extends from an arm-pivot end to a leg-hub end that is proximal to the leg hub and wherein the hub flanges of the arm hub are configured on the arm-pivot end.

6. The fishing rod stand assembly of claim 5, wherein the arm hub further comprises arm-hub end flanges configured on the leg-hub end of the arm hub.

7. The fishing rod stand assembly of claim 1, wherein the arm hub comprises hub flanges configured to flex radially outward to receive the fishing rod support shaft.

8. The fishing rod stand assembly of claim 7, wherein the arm hub extends from an arm-pivot end to a leg-hub end that is proximal to the leg hub and wherein the hub flanges of the arm hub are configured on the arm-pivot end.

9. The fishing rod stand assembly of claim 8, wherein the arm hub further comprises arm-hub end flanges configured on the leg-hub end of the arm hub.

10. The fishing rod stand assembly of claim 1, further comprising a leg stop coupled to the angle adjustable leg and configured between the slidable support-arm coupling and the foot end of the angle adjustable leg.

11. The fishing rod stand assembly of claim 10, wherein the leg stop is slidably adjustable in position along the angle adjustable leg.

12. The fishing rod stand assembly of claim 1, further comprising a support-arm coupling lock that is configured to secure the slidable support-arm coupling in a fixed position along the angle adjustable support leg.

13. The fishing rod stand assembly of claim 12, wherein the angle adjustable leg comprises a foot on the foot end that is tapered to said foot end and wherein the foot comprises a metal portion extending to the foot end.

14. The fishing rod stand assembly of claim 1, wherein the fishing rod support shaft is length adjustable.

15. The fishing rod stand assembly of claim 1, wherein the fishing rod support comprises a rod yoke configured on the rod end, said rod yoke comprises a first yoke extension and a second yoke extension forming a Y-shaped yoke configured to receive a fishing rod therein.

16. The fishing rod stand assembly of claim 1, wherein the pair of legs and the angle adjustable leg each comprise a foot on the foot end that is tapered to said foot end.

17. The fishing rod stand assembly of claim 16, wherein the foot comprises a metal portion extending to the foot end.

18. A fishing rod stand assembly comprising:
a) a fishing rod;
b) a fishing rod support comprising:
  i) a shaft extending from an insert end to a rod end;
  ii) a rod yoke configured on the rod end and comprising:
    a first yoke extension; and
    a second yoke extension;
c) a fishing rod support tripod comprising:
  i) a leg hub comprising leg-hub flanges that are configured to flex radially outward to receive the fishing rod support shaft;
  ii) an arm hub comprising arm-hub flanges that are configured to flex radially outward to receive the fishing rod support shaft;
  iii) a plurality of support arms;
  iv) a pair of legs each extending from a respective hub end to a respective foot end;
    wherein each of the pair of legs are coupled to the leg hub by a respective leg-hub pivot; and
    wherein each of the pair of legs is coupled to the arm hub by a respective one of the plurality of support arms coupled to the respective leg by an arm-coupling pivot and to the arm hub by an arm-hub pivot;
  v) an angle adjustable leg extending from a hub end to a foot end;
    wherein the angle adjustable leg is coupled to the leg hub by a leg-hub pivot; and
    wherein the angle adjustable leg is coupled to the arm hub by a respective one of the plurality of support arms that is coupled to the angle adjustable leg by an arm-coupling pivot and to the arm hub by an arm-hub pivot;
  wherein the arm-coupling pivot coupled to the angle adjustable leg is attached to a slidable support-arm coupling that is configured to slide along the angle adjustable leg to change an angle of the angle adjustable leg, and
  wherein the leg hub is configured to slide along the shaft of the fishing rod support to pivot the pair of legs and the angle adjustable leg in towards the arm hub.

19. The fishing rod stand assembly of claim 18, wherein the leg-hub flanges are configured on the leg-pivot end of the leg hub and wherein the arm-hub flanges are configured on the arm-pivot end of the arm hub.

* * * * *